(12) United States Patent
Hicks et al.

(10) Patent No.: US 12,107,404 B2
(45) Date of Patent: Oct. 1, 2024

(54) JUNCTION BOX ASSEMBLY HAVING AN ANCILLARY BOX

(71) Applicant: Sumitomo Wiring Systems, Ltd., Yokkaichi (JP)

(72) Inventors: Cody Hicks, Farmington Hills, MI (US); Brian Carnick, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 222 days.

(21) Appl. No.: 17/807,766

(22) Filed: Jun. 20, 2022

(65) Prior Publication Data

US 2023/0411942 A1 Dec. 21, 2023

(51) Int. Cl.
*H02G 3/08* (2006.01)

(52) U.S. Cl.
CPC ............. *H02G 3/086* (2013.01); *H02G 3/081* (2013.01)

(58) Field of Classification Search
CPC .......... H02G 3/08; H02G 3/081; H02G 3/086; H02G 3/083; H05K 5/00; H05K 5/02; B60R 16/00; B60R 16/02; B60R 16/0239; B60R 16/0238; H01R 13/46
USPC ..... 174/50, 520, 53, 57, 58, 535, 17 R, 559, 174/542, 560, 561; 220/3.2–3.9, 4.02; 248/906; 439/76.1, 76.2; 361/600, 601
See application file for complete search history.

(56) References Cited

U.S. PATENT DOCUMENTS

| | | | | |
|---|---|---|---|---|
| 6,027,360 A * | 2/2000 | Jenkins | .............. | H01R 13/6215 439/364 |
| 6,375,517 B1 * | 4/2002 | Okabe | .................. | H01R 13/514 439/594 |
| 7,497,699 B2 * | 3/2009 | Neville | .................. | H02G 3/081 439/701 |
| 8,163,994 B2 * | 4/2012 | Taniguchi | .............. | H02G 3/081 174/559 |
| 9,966,748 B1 * | 5/2018 | Eom | ........................ | H02G 3/14 |
| 10,014,675 B2 * | 7/2018 | Kobayashi | ........... | H01R 13/512 |
| 11,394,187 B2 * | 7/2022 | Tashiro | .............. | B60R 16/0239 |
| 11,575,252 B2 * | 2/2023 | Ando | .................. | B60R 16/0239 |
| 11,640,881 B2 * | 5/2023 | Carnick | .................. | B60R 16/03 174/535 |
| 11,654,844 B2 * | 5/2023 | Tashiro | .................... | H02G 3/16 439/76.2 |
| 11,713,009 B2 * | 8/2023 | Kurata | ................ | B60R 16/0238 439/76.2 |
| 11,715,941 B2 * | 8/2023 | Li | .......................... | H02G 3/083 174/559 |

* cited by examiner

*Primary Examiner* — Angel R Estrada
(74) *Attorney, Agent, or Firm* — Honigman LLP (57) ABSTRACT

An ancillary box is configured to be mounted to a junction box assembly. The ancillary box is configured to provide housing for an electrical component (e.g., switch assembly). The ancillary box includes a first housing having a first top wall, a first back wall, a pair of first side walls, and a first bottom wall. The first top wall, the first back wall, the pair of first side walls, and the first bottom wall are connected to each other to define an open front. The ancillary box further includes an engagement feature that is disposed on a top surface of the first top wall and centered between the pair of first side walls.

8 Claims, 9 Drawing Sheets

JUNCTION BOX ASSEMBLY HAVING AN ANCILLARY BOX

TECHNICAL FIELD

The disclosure relates to a junction box assembly.

BACKGROUND

Junction box assemblies are known for use in automotive vehicles. Junction box assemblies are configured to facilitate the distribution of power throughout various electric devices of the vehicle. With the increasing electrification and automation of automotive vehicles comes in increase in the number of the number of electric devices. Accordingly, the number of power distribution related components (e.g., switch assembly) necessary to control or operate the electrical devices has also increased. However, packaging constraints may not allow for the inclusion of all of the components (e.g., switch assembly) within the junction box assembly (which is also known as a power distribution box). Additionally, the junction box assembly may be used for multiple vehicular platforms and thus a need for a particular electric device in one platform may not be necessary for another platform. Thus, some vehicles may require an additional component (e.g., switch assembly) while others may not.

It is known that the packaging constraints within the vehicle may be limited and in some cases the space available to mount the additional component is disposed on an exterior surface of the junction box assembly. In such instances, the area of the exterior surface needed to attach the additional component includes not only the surface area of the additional component, but an area of the exterior surface which accommodates the installation of the additional component onto the exterior surface of the junction boxy assembly. Thus, the space for the attachment of other components onto the exterior surface is limited.

In some instance, the packaging space requires the additional component to be mounted to a bottom surface of the junction box assembly. However, in such a case, the additional component may rattle against the junction box assembly causing unpleasant noise and/or an electrical connection failure.

Accordingly, it is desirable to have a junction box assembly and an ancillary box configured to minimize the surface area needed to install the ancillary box to the junction box assembly so as to provide space for the attachment of other components. It is further desirable have an ancillary box configured to attach to a junction box assembly in a manner which minimizes rattling between the two parts.

SUMMARY

In one aspect, an ancillary box is provided. The ancillary box is configured to provide housing for an electrical component (e.g., switch assembly). The ancillary box includes a first housing having a first top wall, a first back wall, a pair of first side walls, and a first bottom wall. The first top wall, the first back wall, the pair of first side walls, and the first bottom wall are connected to each other to define an open front. The ancillary box further includes an engagement feature that is disposed on a top surface of the first top wall and centered between the pair of first side walls.

In one aspect, the engagement feature includes a proximal end and a distal end which is opposite of the proximal end. The proximal end is coplanar with the open front of the first housing.

In another aspect, the engagement feature includes a neck member and a lip member. The neck member is orthogonal to the first top wall. The lip member is also orthogonal to the neck member so as to be parallel to the first top wall.

In another aspect, the neck member includes a pair of ribs spaced apart from each other.

In another aspect, the lip member is centered with respect to the neck member.

In another aspect, a distal end of the neck member is rounded.

In another aspect, the ancillary box further includes a pair of rails spaced apart from each other. One of the pair of rails is disposed on one of the pair of first side walls, and the other of the pair of rails is disposed on the other of the pair of first side walls.

In another aspect, the ancillary box further includes a pair of attachment features disposed on the pair of first side walls. The pair of attachment features is disposed beneath the pair of rails.

In another aspect, a top surface of each of the pair of rails is coplanar with the top surface of the first top wall.

In another aspect, a length of the pair of rails is greater than a length of the engagement feature.

In another aspect, each of the pair of rails includes a shoulder portion disposed on a corresponding one of the first pair of side walls, the shoulder portions being integrally formed to the corresponding one of the pair of rails and extending towards the first bottom wall.

Also disclosed herein is a junction box assembly. The junction box assembly is configured to distribute power to various electric components. The junction box assembly includes a second housing having a second top wall, a second back wall, a pair of second side walls, a second bottom wall and a second front wall coupled together to define a compartment space. One of the second top wall, the second back wall, the pair of second side walls, the second bottom wall and the second front wall includes a center slot. An ancillary box includes a first housing having a first top wall, a first back wall, a pair of second side walls and a first bottom wall, the first top wall, the first back wall. The pair of second side walls and the first bottom wall are connected to each other to define an open front. The further includes an engagement feature disposed on a top surface of the first top wall and centered between the pair of first side walls. The engagement feature is configured to engage the center slot so as to secure the ancillary box to the second housing.

In one aspect, the junction box further includes a pair of side slots space apart from each other, the center slot is disposed between the pair of side slots. The ancillary box includes a pair of rails spaced apart from each other. One of the pair of rails is disposed on one of the pair of first side walls and the other of the pair of rails is disposed on the other of the pair of side walls. The pair of rails is configured to engage the pair of side slots.

In another aspect, a top surface of each of the pair of rails is coplanar with the top surface of the first wall.

In another aspect, each of the pair of rails includes a shoulder portion disposed on a corresponding one of the first pair of side walls. The shoulder portions are being integrally formed to the corresponding one of the pair of rails. The shoulder portions are extending towards the first bottom wall.

In another aspect, the engagement feature includes a proximal end and a distal end which is opposite of the proximal end. The proximal end is coplanar with the open front of the first housing.

In another aspect, the engagement feature includes a neck member and a lip member. The neck member is orthogonal to the first top wall. The lip member is also orthogonal to the neck member so as to be parallel to the first top wall. The neck member and the lip member are configured to be disposed within the center slot.

In another aspect, the ancillary box further includes a pair of attachment features disposed on the pair of first side walls. The pair of attachment features is disposed beneath the pair of rails.

In another aspect, second bottom wall is removably attached to the second top wall, the second back wall, and the pair of first side walls so as to define a lower cover. The center slot and the pair of side slots are disposed on the lower cover.

In another aspect, the second bottom wall includes a pair of holes. The center slot and the pair of side slots are interposed between the pair of holes.

DETAILED DESCRIPTION OF PREFERRED EMBODIMENTS

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Directional terms used herein, such as "top", "bottom", "front" and "back" are made in reference to the upright orientation of the corresponding part shown in the reference figure(s) unless otherwise stated.

An ancillary box and a junction box assembly configured to hold the ancillary box are provided. The ancillary box is configured to be mounted to the junction box. The ancillary box includes a first housing that is configured to removably couple to the junction box assembly. The first housing includes a first top wall, a first back wall, a pair of first side walls, and a first bottom wall. The first top wall, the first back wall, the pair of first side walls, and the first bottom wall are connected to each other to define or form an open front. The open front provides an access so a component such as electrical component (e.g., switch assembly) can be installed or inserted into the first housing. The first housing further includes an engagement feature disposed on a top surface of the first top wall of the first housing. The engagement feature of the ancillary box is disposed at a center portion of the top surface of the first top wall between the pair of first side walls. The engagement feature is configured to engage with a center slot of junction box so as to secure the ancillary box to the junction box. Accordingly, attachment of the ancillary box to the junction box assembly requires an insertion distance defined by the length of the center slot so as to allow for more space to attach other components relative to current junction box assemblies. Further, the ancillary box is securely mounted to or attached to the junction box assembly while the engagement feature of the ancillary box is engaged with the center slot of the junction box assembly so as to eliminate or reduce a rattle when the ancillary box is held by or mounted to the junction box assembly.

Figure 1:
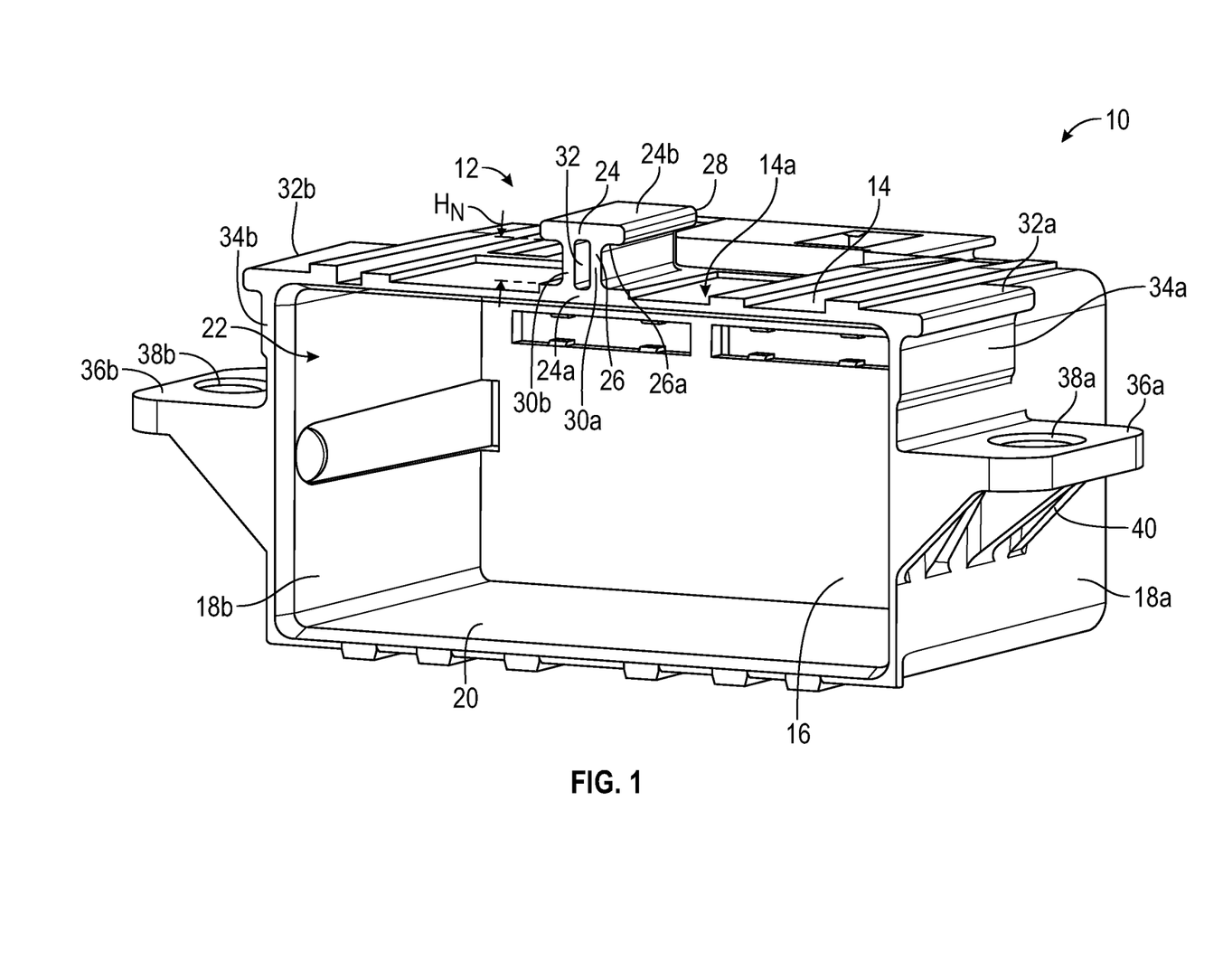
FIG. 1 is a front perspective view of an ancillary box according to one aspect illustrated herein.
Figure 2:
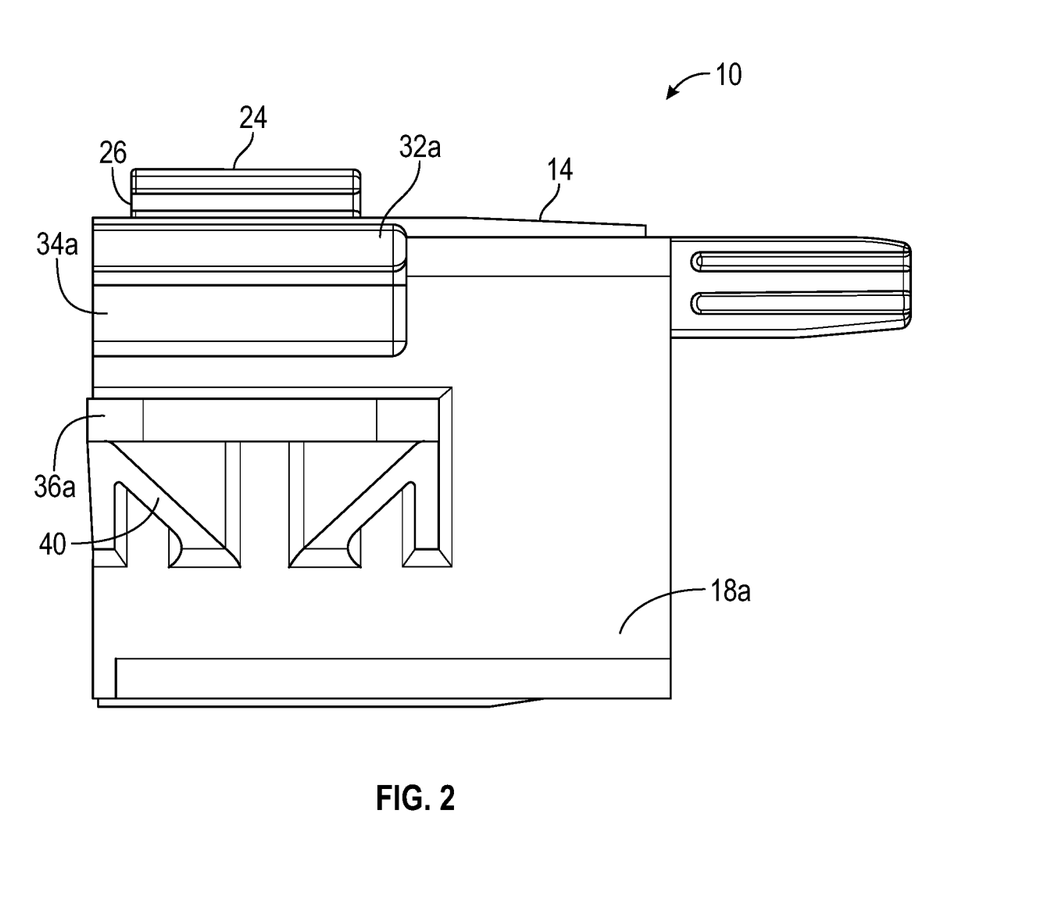
FIG. 2 is a side perspective view of the ancillary box shown in FIG. 1.

With reference now to FIGS. 1 and 2, an ancillary box 10 configured to attach to a junction box 102 is provided. FIG. 1 depicts the ancillary box 10 in a front perspective view. As shown, the ancillary box 10 includes a first housing 12 configured to hold an electrical component such as a switch assembly (not shown). The first housing 12 includes a first top wall 14, a first back wall 16, a pair of first side walls 18a, 18b, and a first bottom wall 20. The first top wall 14, the first back wall 16, the pair of first side walls 18a, 18b, and the first bottom wall 20 are coupled or connected to each other to define or form an open front 22 of the first housing 12 dimensioned to receive the component such as an electrical component (e.g., switch assembly).

The ancillary box 10 includes an engagement feature 24 configured to couple with the junction box 102. The engagement feature 24 is disposed on a top surface 14a of the first top wall 14 of the first housing 12. The engagement feature 24 may be centered on the top surface 14a of the first top wall 14 between the pair of first side walls 18a, 18b. The engagement feature 24 includes a proximal end 24a and a distal end 24b opposite of the proximal end 24a. The proximal end 24a adjacent the front end of the first top wall 14 so as to be coplanar with the open front 22 of the first housing 12 in accordance with some implementations.

In one aspect of an engagement feature 24, the engagement feature 24 includes a neck member 26 and a lip member 28. The neck member 26 extends longitudinally between the proximal end 24a and the distal end 24b of the engagement feature 24. The neck member 26 is generally orthogonal to the first top wall 14 of the first housing 12 so as to define a height "$H_N$". The lip member 28 is disposed on top of the neck member 26 and is generally orthogonal to the neck member 26 so as to be parallel with the first top wall 14 (and the top surface 14a). The neck member 26 bifurcates the lip member 28 along a longitudinal axis of the lip member 28.

In one configuration, the neck member 26 includes a pair of ribs 30a, 30b spaced apart from each other so as to define an elongated slot 32 extending a length of the pair of ribs 30a, 30b. The elongated slot 32 between the pair of ribs 30a, 30b provides a room for each of the ribs 30a, 30b to flex or bend in an inward direction so as to accommodate a manufacturing tolerance, as explained in greater detail below. In other configurations, the neck member 26 is formed as a unitary piece. In other configurations, a distal end 26a of the neck member 26 may be rounded. Such a configuration facilitates the registration of the engagement feature 24 with junction box 102. Such configurations are designed to facilitate the coupling of the ancillary box 10 with the junction box 102 as described in greater detail below.

The ancillary box 10 may further include a pair of rails 32a, 32b (first rail and second rail respectively) spaced apart from each other. The pair of rails 32a, 32b are symmetrical to each other and thus a discussion of one is sufficient to describe the other. The first rail 32a is disposed on the first side wall 18a and the second rail 32b is disposed on the first side wall 18b. A portion of each of the rails 32a, 32b are disposed on the top surface of the first top wall 14 and extend laterally from the corresponding first side walls 18a, 18b and are generally orthogonal to a respective one of the first side walls 18a, 18b.

As shown, the first rail 32a and the second rail 32b are coplanar with the top surface 14a of the first top wall 14. As illustrated in FIGS. 1 and 2, the length for each of the first rail 32a and the second rail 32b is greater than the length of the engagement feature 24 in accordance with some implementations. As shown, the length of the first rail 32a is equal or substantially equal to the length of the second rail 32b in some implementations.

As shown, each of the pair of rails 32a, 32b includes a shoulder portion 34a, 34b disposed on a corresponding one of the pair of first side walls 18a, 18b in accordance with some implementations. The shoulder portions 34a, 34b are being integrally formed to the corresponding one of the pair of rails 32a, 32b and extending towards the first bottom wall 20 of the first housing 12. As a result, the shoulder portions 34a, 34b provide sufficient structural support to the pair of rails 32a, 32b.

In some implementations, the ancillary box 10 further includes a pair of attachment features 36a, 36b disposed on the pair of the first side walls 18a, 18b. The first attachment feature 36a and the second attachment feature 36b are disposed beneath a respective first rail 32a and the second rail 32b. The pair of attachment features 36a, 36b are configured to facilitate a mechanical attachment of the ancillary box 10 to the junction box 102. The pair of attachment features 36a, 36b are symmetrical to each other and thus a discussion of one is sufficient to describe the other. The pair of attachment features 36a, 36b are generally planar members extending orthogonally from the respective first side walls 18a, 18b and disposed beneath a corresponding pair of rails 32a, 32b and generally parallel to the corresponding pair of rails 32a, 32b. The bottom of the attachment features 36a, 36b may include support ribs 40 to provide structural support for the respective attachment features 36a, 36b. Each of the pair of attachment features 36a, 36b may include a first through-hole 38a, 38b dimensioned to receive a bolt (not shown) for securing the ancillary box 10 to the junction box 102.

Figure 3:
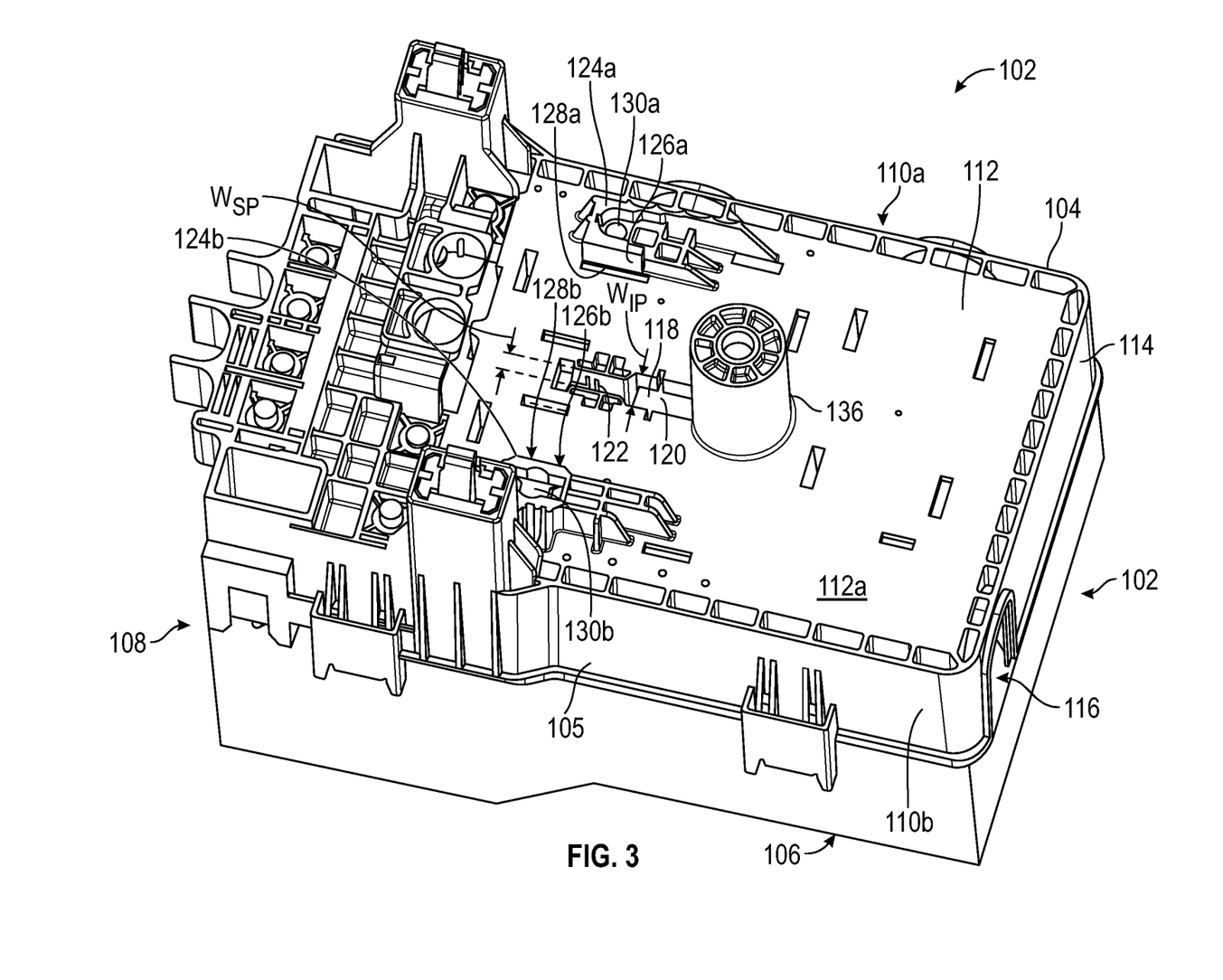
FIG. 3 is a perspective view of a junction box according to one or more aspects illustrated herein.

With reference now to FIG. 3, a junction box 102 is provided. The junction box 102 is configured to accommodate various electronic components, such as fuses, switches and the like (not shown) configured to distribute power. The junction box 102 includes various mounting features for attaching the junction box 102 to a structure such as an automotive vehicle (not shown). The junction box 102 is further configured to engage in a secured manner the ancillary box 10.

As shown in FIG. 3, the junction box 102 includes a second housing 104 which defines a lower cover 105 of the junction box 102. The second housing 104 includes a second top wall 106, a second back wall 108, a pair of second side walls 110a, 110b, a second bottom wall 112, and a second front wall 114 that are coupled together to define compartment space 116 for holding the electric components. Preferably, the second housing 104 is formed by a material suitable for an injection molding process; however, it should be appreciated that the second housing 104 may be formed by any material having the rigidity to provide support for the electric components.

With reference now to FIGS. 3 and 5-9, the second housing 104 is configured to engage the ancillary box 10 in a manner where the ancillary box 10 is secured to an outer surface of the second housing 104. In one aspect, the second housing 104 is configured to secure the ancillary box 10 to the outer surface of the second bottom wall 112.

Figure 4:
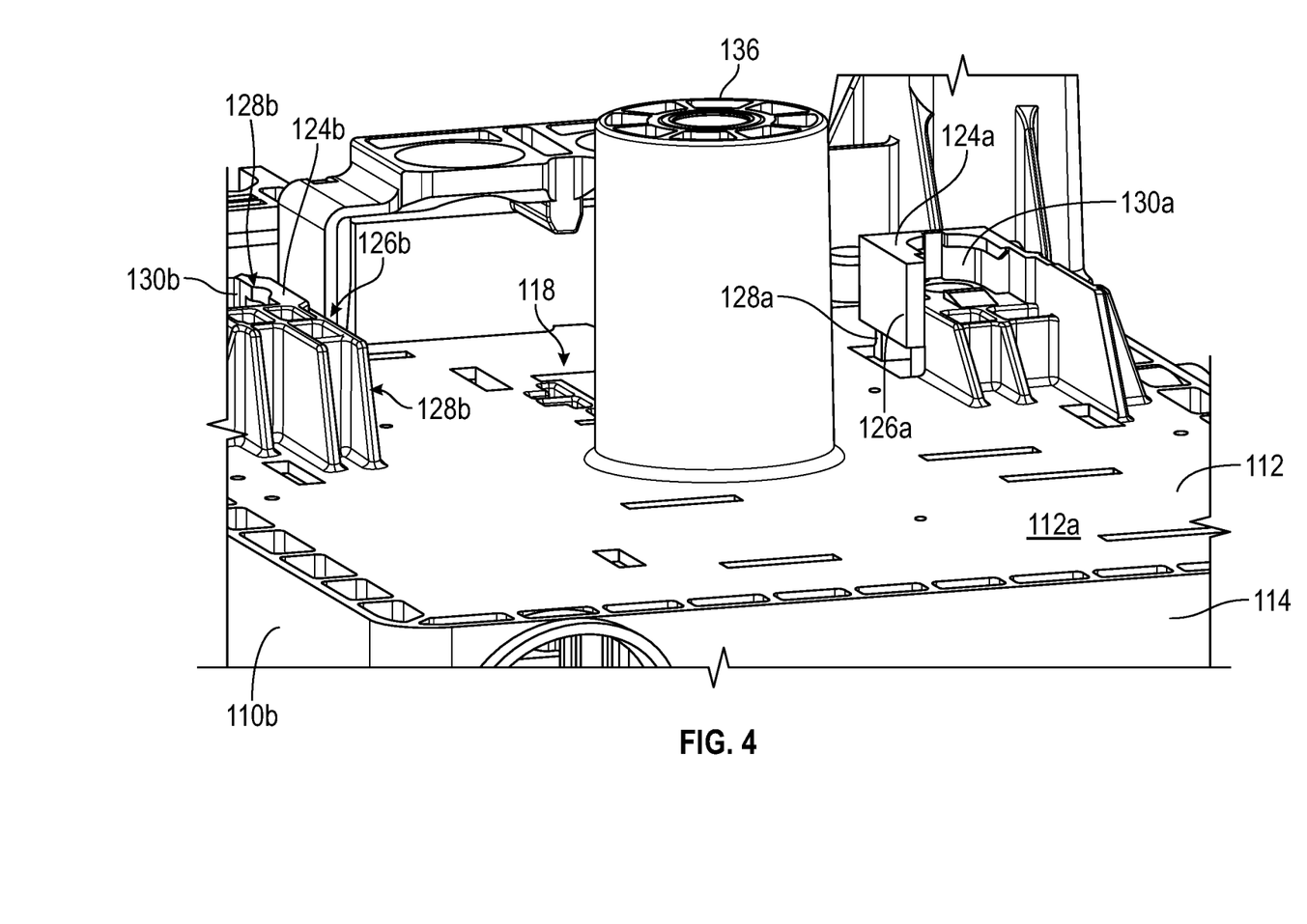
FIG. 4 is a close-up view of the junction box shown in FIG. 3 showing a center slot and at least one of the side slots.
Figure 5:
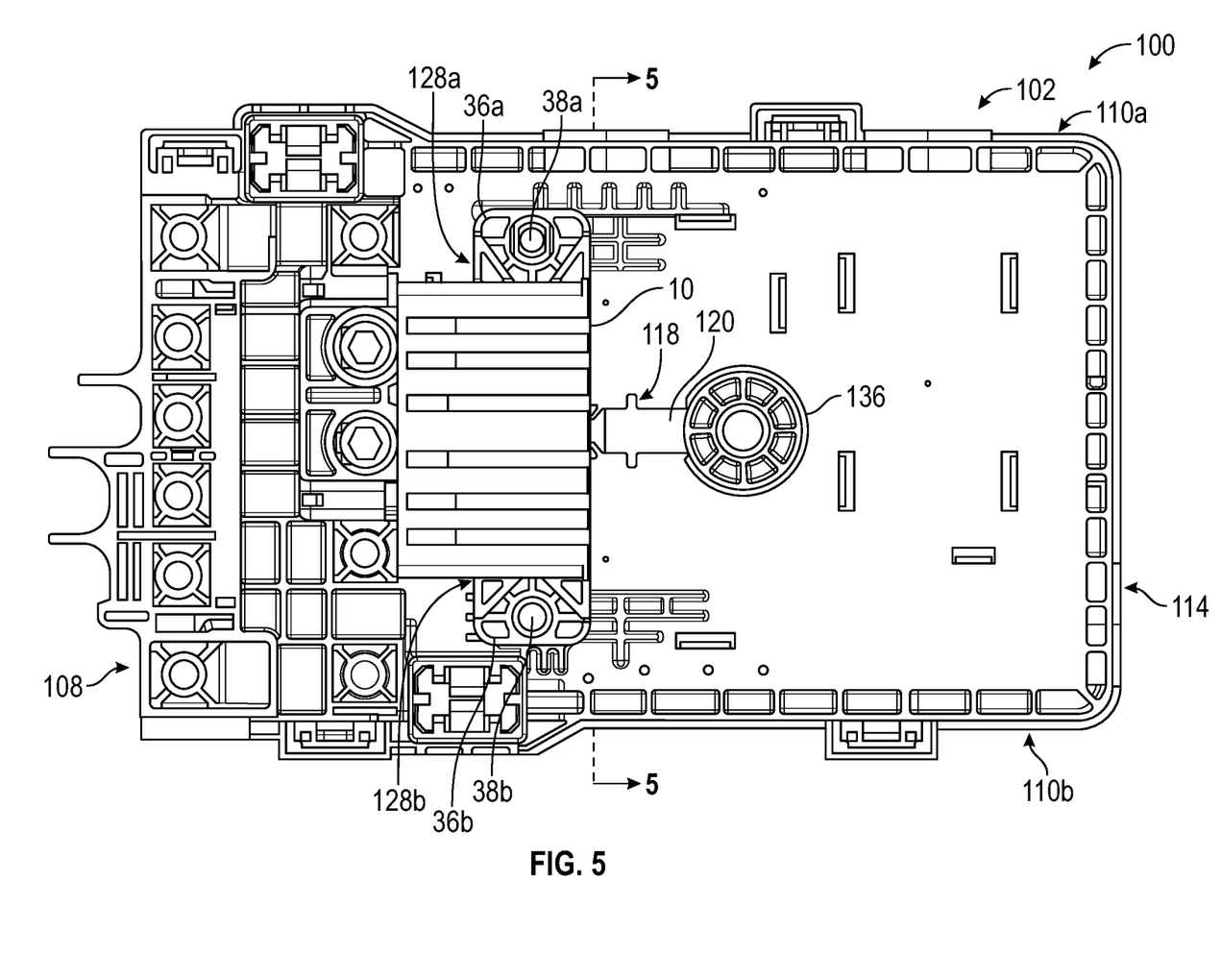
FIG. 5 is a top down view of a junction box assembly according to one or more aspects illustrated herein showing the ancillary box in an engaged position.

In one configuration, the second bottom wall 112 may include a center slot 118 extending through the second bottom wall 112. The center slot 118 is generally centered between the second sidewalls 110a, 110b and the second back wall 108 and the second front wall 114. The center slot 118 may include an insertion portion 120 and a slide portion 122 which are contiguous with each other. A width "$W_{IP}$" of the insertion portion 120 is wider than a width "$W_{SP}$" of the slide portion 122. A distal end of the insertion portion 120 is angled towards a proximal end of the slide portion 122 so as to taper from the insertion portion 120 to the slide portion 122.

The second bottom wall 112 further includes a pair of mounting structures 124a, 124b disposed on the outer surface of the second bottom wall 112 and spaced apart from each other. Each of the mounting structures 124a, 124b includes an interior wall 126a, 126b disposed on the interior surface of the mounting structures 124a, 124b so as to face each other. The interior wall 126a, 126b are spaced apart from the outer surface of the second bottom wall 112 so as to define a respective side slot 128a, 128b. The side slots 128a, 128b are symmetrical to each other and each side slot 128a, 128b has a constant width and height along its length so as to be generally cuboidal.

The mounting structures 124a, 124b further include bolt holes 130a, 130b. The bolt holes 130a, 130b are opposite of each other, wherein the center slot 118 and the side slots 128a, 128b are interposed between the bolt holes 130a, 130b. Each of the bolt holes 130a, 130b has a dimensioned configured to receive a shaft of a bolt.

Figure 7:
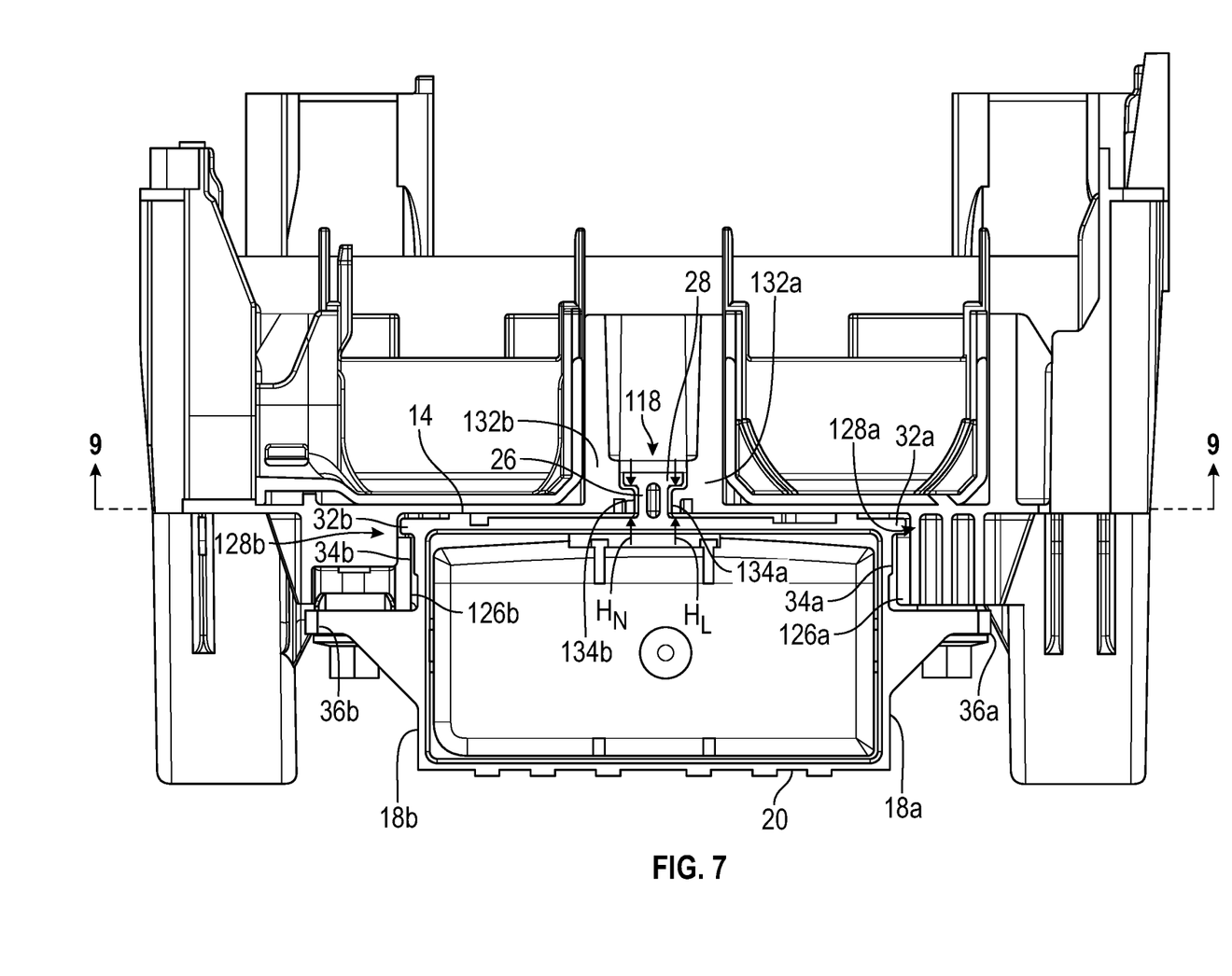
FIG. 7 is a cross-sectional view of FIG. 5 taken along line 5-5.
Figure 8:
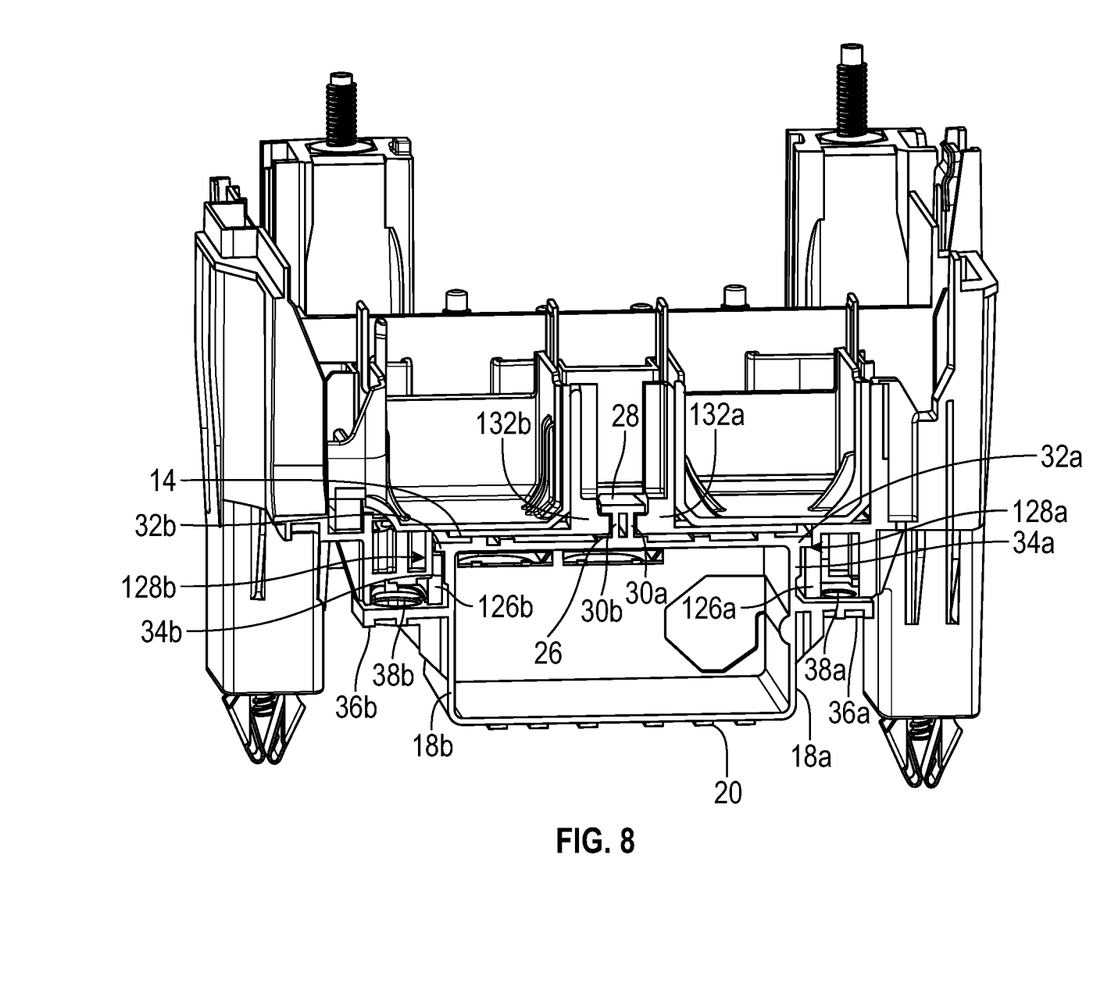
FIG. 8 is a perspective view of FIG. 7 showing the electric component removed.

With reference now to FIGS. 7 and 8, a pair of support walls 132a, 132b are disposed on an interior surface 112a of the second bottom wall 112. The pair of support walls 132a, 132b are spaced apart from each other and the center slot 118 is interposed between the pair of support walls 132a, 132b. The pair of support walls 132a, 132b includes an inner ledge 134a, 134b which define a cut-out on a top portion of the respective support walls 132a, 132b. The inner ledges 134a, 134b have a height "$H_L$" which is slightly greater than the height "$H_N$" of the neck member 26 (shown in FIG. 1).

The ancillary box 10 is coupled to the junction box 102 to form a junction box assembly 100. For illustrative purposes the junction box assembly 100 is described within the context of an automotive vehicle, and may be mounted within a packaging space of the automotive vehicle, such as underneath a hood.

The junction box 102 includes attachment structures for attaching the junction box 102 to a structure within the automotive vehicle. For illustrative purposes, the junction box 102 is configured to be mounted in a manner where the ancillary box 10 is suspended from the second bottom wall 112 of the junction box 102. The ancillary box 10 may be attached to the second bottom wall 112 prior to installment within the packaging space, or may be attached to the second bottom wall 112 after the junction box 102 is installed in the packaging space.

Figure 6:
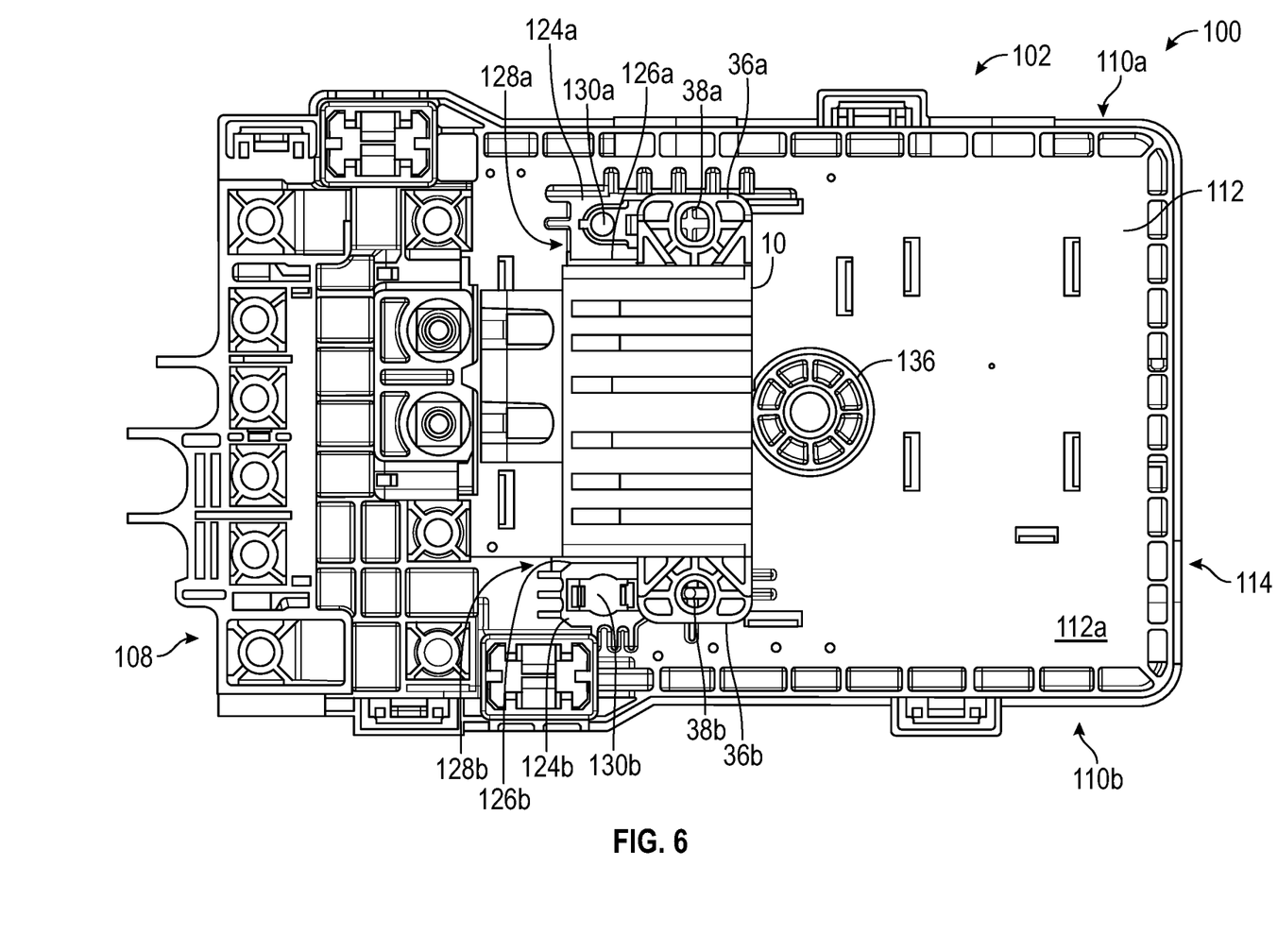
FIG. 6 is a top down view of an ancillary box in an insertion position.

In assembly, the engagement feature 24 of the ancillary box 10 is seated into the center slot 118 of the junction box 102. In particular, the neck member 26 is pushed into the insertion portion 120 of the center slot 118. In such a position, the rails 32a, 32b are registered to engage a respective side slots 128a, 128b of the mounting structures 124a, 124b disposed on the second bottom wall 112, as shown in FIG. 6. FIG. 6 also depicts how the attachment features 36a, 36b are free and clear of the bolt holes 130a, 130b of the mounting structures 124a, 124b.

Figure 9:
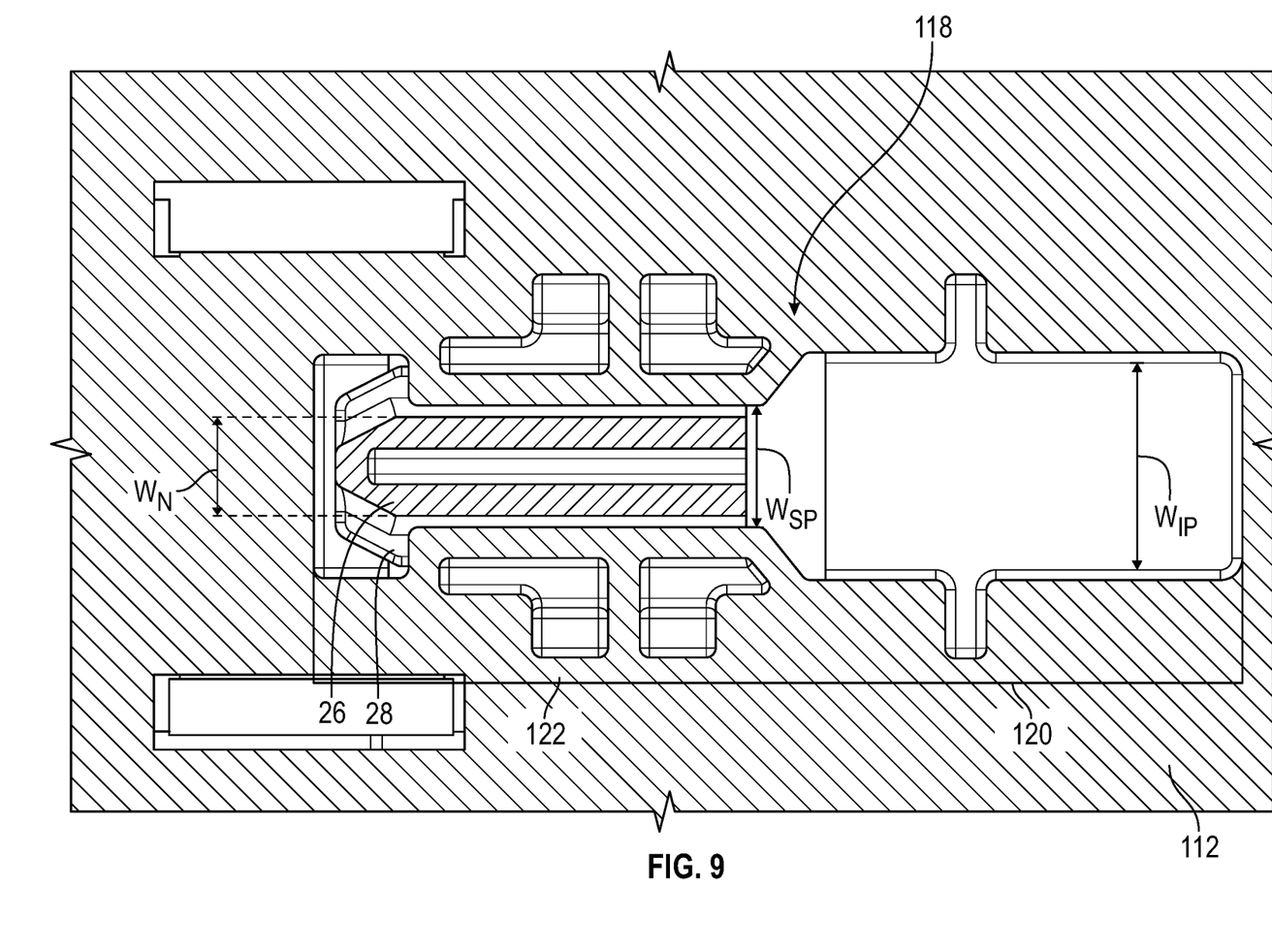
FIG. 9 is a cross-sectional view of FIG. 7 taken along line 9-9.

With reference now to FIGS. 5 and 7-9, the ancillary box 10 is pushed towards the second back wall 108 of the junction box 102, wherein the neck member 26 is slid into the slide portion 122 of the center slot 118 and the rails 32a, 32b are disposed within side slots 128a, 128b. FIG. 9 depicts the taper of the insertion portion 120 facilitating the introduction of the neck member 26 of the engagement feature 24 into the slide portion 122 of the center slot 118. It should be appreciated that the distal end of the neck member 26 is rounded and thus works with the taper in the insert portion 120 to facilitate the introduction of the neck member 26.

FIGS. 7-9 also depict the structural relationship between the width "$W_N$" of the neck member 26 and the width "$W_{SP}$" of slide portion 122 of the center slot 118. In particular, the width "$W_N$" of the neck member 26 is slightly smaller than the width "$W_{SP}$" of slide portion 122 so as to retain the engagement feature 24 within the slide portion 122.

FIGS. 8 and 9 illustrate how the lip member 28 of the engagement feature 24 rests on the interior surface of the second bottom wall 112. Thus, when suspended, the lip member 28 supports the weight of the ancillary box 10 by engagement with the interior surface of the second bottom wall 112. In particular, the lip member 28 is seated upon the inner ledges 134a, 134b. The width "$W_N$" of neck member 26 is slightly smaller than the width "$W_{SP}$" of the slide portion 122 of the center slot 118, and the height "$H_N$" of the neck member 26 is slightly greater than the height "$H_L$" of the inner ledges 134a, 134b so as to be fitted within the slide portion 122 of the center slot 118 with minimal tolerance.

The pair of rails 32a, 32b are disposed within a respective side slot 128a, 128b. A height of the rails 32a, 32b is slightly less than a height of the side slot 128a, 128b. Accordingly, the rails 32a, 32b are disposed within a respective side slot 128a, 128b with minimal tolerance. The rails 32a, 32b are pressed against a top surface of the interior wall 126a, 126b by the weight of the ancillary box 10 when held in suspension, as shown in FIGS. 7 and 8. The shoulder portions 34a, 34b are dimensioned to press against the interior surface of the interior walls 126a, 126b so as to prevent movement of the ancillary box 10 along a width of the ancillary box 10. Accordingly, rattling of the ancillary box 10 is dampened.

With reference again to FIGS. 5, 7 and 8 the ancillary box 10 is shown fully inserted into the slide portion 122 of the center slot 118. In such a position, the bolt holes 130a, 130b of the mounting structures 124a, 124b are registered with the first through-hole 38a, 38b of the pair of attachment features 36a, 36b. The attachment features 36a, 36b are disposed on the respective first side walls 18a, 18b so as to provide clearance for the mounting structures 124a, 124b and covers the mounting structures 124a, 124b when the ancillary box 10 is fully seated within the slide portion 128. Accordingly, a bolt may be used to further secure the ancillary box 10 to the junction box 102.

FIGS. 6 and 7 depict the amount of space (the "installation space") needed to install the ancillary box 10. The area of the installation space is the approximately a length of the insertion portion 120 of the center slot 118 in addition to the length of the ancillary box 10 itself by the width of ancillary box 10. Accordingly, a large portion of the surface area of the second bottom wall 112 may be used to accommodate additional components. For instance, a mounting post 136 may be centered with respect to the second bottom wall 112, which allows the attachment of the junction box assembly 100 to a vehicle structure wherein the weight of the junction box assembly 100 may be distributed equally along its length and width. The remaining free space of the second bottom wall 112 is free to accommodate additional components so as to maximize the packaging space of the junction box assembly 100.

We claim:

1. A junction box assembly comprising:
a second housing having a second top wall, a second back wall, a pair of second side walls, a second bottom wall and a second front wall coupled together to define a compartment space;
wherein one of the second top wall, the second back wall, the pair of second side walls, the second bottom wall and the second front wall includes a center slot and a pair of side slots space apart from each other, the center slot is disposed between the pair of side slots; and
an ancillary box including:
a first housing having a first top wall, a first back wall, a pair of first side walls and a first bottom wall, the first top wall, the first back wall, the pair of first side walls and the first bottom wall connected to each other to define an open front;

an engagement feature disposed on a top surface of the first top wall and centered between the pair of first side walls, the engagement feature configured to engage the center slot so as to secure the ancillary box to the second housing; and wherein the ancillary box includes a pair of rails spaced apart from each other, wherein one of the pair of rails is disposed on one of the pair of first side walls and the other of the pair of rails is disposed on the other of the pair of side walls, the pair of rails configured to engage the pair of side slots.

2. The junction box assembly as set forth in claim 1, wherein a top surface of each of the pair of rails is coplanar with the top surface of the first wall.

3. The junction box assembly as set forth in claim 2, wherein each of the pair of rails includes a shoulder portion disposed on a corresponding one of the first pair of side walls, the shoulder portions being integrally formed to the corresponding one of the pair of rails and extending towards the first bottom wall.

4. The junction box assembly as set forth in claim 3, wherein the engagement feature includes a proximal end opposite of a distal end, the proximal end coplanar with the open front of the first housing.

5. The junction box assembly as set forth in claim 4, wherein the engagement feature includes a neck member and a lip member, the neck member orthogonal to the first top wall, the lip member orthogonal to the neck member so as to be parallel to the first top wall, the neck member and the lip member configured to be disposed within the center slot.

6. The junction box assembly as set forth in claim 5, wherein the ancillary box further includes a pair of attachment features disposed on the pair of first side walls, the pair of attachment features disposed beneath the pair of rails.

7. The junction box assembly as set forth in claim 6, wherein second bottom wall is removably attached to the second top wall, the second back wall, and the pair of first side walls so as to define a lower cover, the center slot and the pair of side slots are disposed on the lower cover.

8. The junction box assembly as set forth in claim 7, wherein the second bottom wall includes a pair of holes, the center slot and the pair of side slots are interposed between the pair of holes.

* * * * *